United States Patent [19]

Maggioni

[11] 3,929,913

[45] Dec. 30, 1975

[54] PROCESS FOR PREPARING DIPHENOLS

[75] Inventor: Paolo Maggioni, Cernusco Montevecchia (Como), Italy

[73] Assignee: Brichima S.p.A., Milan, Italy

[22] Filed: Feb. 5, 1974

[21] Appl. No.: 439,713

[30] Foreign Application Priority Data
Feb. 16, 1973 Italy.................................. 20497/73

[52] U.S. Cl........................ 260/621 G; 252/431 R
[51] Int. Cl.[2].......................................... C07C 37/00
[58] Field of Search................................ 260/621 G

[56] References Cited
UNITED STATES PATENTS

| | | | |
|---|---|---|---|
| 1,595,299 | 8/1926 | Hale............................... | 260/621 G |
| 3,377,386 | 4/1968 | Chafetz........................... | 260/621 G |
| 3,662,006 | 5/1972 | Massie et al..................... | 260/621 G |
| 3,825,604 | 7/1974 | Matsuzawa et al.............. | 260/621 G |

Primary Examiner—Norman Morgenstern
Attorney, Agent, or Firm—Stevens, Davis, Miller & Mosher

[57] ABSTRACT

A new process for the preparation of a mixture of pyrocathechin and hydroquinone prevailingly consisting of pyrocatechin, by direct hydroxylation of phenol with hydrogen peroxide. The novelty resides in the use of ferrocene or a derivative thereof as the catalyst. A better control of the reaction, higher yield and an easier final separation are achieved.

8 Claims, No Drawings

PROCESS FOR PREPARING DIPHENOLS

The present invention refers to a new process for the preparation of diphenols through direct hydroxylation of phenol with hydrogen peroxide. More precisely the present invention refers to a process for the preparation of pyrocatechin and hydroquinone as a mixture prevailingly consisting of pyrocatechin, by direct hydroxylation of phenol with hydrogen peroxide in a concentrated aqueous medium, by using a new catalyst. In the previous Italian applications 20,833 and 28,265 A/72 of the same Applicant, processes have been claimed for the preparation of pyrocatechin and hydroquinone by direct hydroxylation of phenol with hydrogen peroxide in an aqueous medium, under the catalitic action of iron and/or cobalt salts.

These processes, although industrially valid, present some less positive aspects which render them somewhat onerous under an economical point of view. As a matter of fact the catalytic action of the metal salts is very strong and the reaction once started by means of little amounts of catalyst is completed in a few tens of seconds.

Such a course of the reaction has essentially three negative consequences:

1. Since it has to do with considerably exothermic processes, in order to keep under control the heat development and thus the reaction there is needed either a complex technology to get over the abruptly developed reaction heat or the conversions to be kept low.
2. The yields on phenol are high, but on hydrogen peroxide are somewhat lower as a consequence of the too strong reaction.
3. The amount and the macromolecular acid nature of the by-products is such as to render complex their separation from the reaction products.

The fact that the characteristic features of the process are not modified in a sensible manner by varying the anion bound to the iron or cobalt salt, is a clear indication that the catalytic activity and the general course of the reaction depend on the metal ion.

We have now surprisingly found a new type of catalyst which presents evident advantages for each of the three above mentioned aspects of the process, while maintaining all of the advantages presented by the preceding processes of the same Applicant with respect to the prior art. The new type of catalyst consists of an organic compound of iron wherein iron is not present as a ion.

More precisely the new catalyst consists of dicyclopentadyenil iron (ferrocene) or of derivatives thereof such as: 1,1'-diacetyl-ferrocene, 1,1'-dibenzoyl-ferrocene, di-n-butyl-ferrocene, ferrocen-dicarbonxylic acid; the essential characteristic with respect to the catalytic activity is that of $\pi$-iron-pseudoaromatic compound. These new catalysts, never used in processes for hydroxilation with hydrogen peroxide or peroxides, show in the process for hydroxilation of phenol an action weaker but more selective than that of iron and cobalt salts.

Such a type of catalytic activity results in a better control of the reaction; particularly speaking the problems of thermal control are reduced to a minimum also with relatively high conversions (20-30percent). Moreover the yields on hydrogen peroxide are remarkably higher (15-20 percent higher) in comparison with those obtained in the process using metal salts. Since hydrogen peroxide is the most costly among the reagents used in the process, a remarkable economical advantage derives therefrom. Under optimum conditions yields are of about 75% on hydrogen peroxide and of about 95 percent on phenol.

Also the amount and the nature of the by-products formed in the process are closely related to the yield on hydrogen peroxide. The by-products form in the process according to the present invention in lower amounts with respect to the processes catalyzed by metal salts; moreover they are characterized by a lower degree of oxidative degradation of the starting phenol, as it may be deduced from their lower acidity. This is an obvious consequence of the lower amount of hydrogen peroxide consumed in the by-processes. Both the above aspects account for an easier separation of pyrocathechin and hydroquinone by simple distillation of the products of reaction.

It is also very interesting the fact that the new catalyst may be recovered by distillation and recycled. The new process is preferably realized by admixing phenol, water and the catalyst at a pH comprised between 1 and 4, while hydrogen peroxide is added as the last component.

The useful amount of catalyst is higher than 10 parts by weight of ferrocenic derivative per 1 million parts by weight of phenol and is preferably comprised between 50 and 1500 parts of catalyst per million.

It is operated at atmospheric pressure, at temperatures comprised between 0° and 100°C, preferably between 30° and 70°C. The molar ratio phenol: hydrogen peroxide is kept higher than 2, preferably between 10 and 3. The weight ratio phenol: water is preferably comprised between 10 and 1.

The process may be carried out also in the presence of an organic solvent, miscible with water and stable to hydrogen peroxide such as for example acetonitrile; according to this alternative the advantage is realized of operating with all the reactants in a single phase, within wide limits. A high concentration of aqueous hydrogen peroxide (between 30 and 60 percent) may be used in the process according to the invention. In order to separate the reaction products, the mixture, when the reaction is ended, undergoes fractional distillation in order to recover the unreacted phenol and the catalyst which are recycled, while separating pyrocatechin and hydroquinone; the by-products remain as a residue of distillation. The conversion is determined by the ratio phenol: hydrogen peroxide and thus is in any case lower than 50%. We furnish hereinafter some illustrative examples which in no way limit the present invention.

EXAMPLE 1

In a 250 ml flask provided with thermometer, stirrer, feeding funnel and reflux cooler, 35 ml of water, 94 g of phenol and 63 mg of ferrocene are introduced. The pH of the mixture is adjusted to 1,2 by adding 3 ml of 0.1 N sulphuric acid. It is heated at 40°C and 5.62 g of 59.4% hydrogen peroxide are added.

The reaction is completed within 2 hours; then the reaction mixture undergoes fractional crystallization and the catalyst, phenol, pyrocathechin and hydroquinone are separated therefrom. The overall yield of diphenols on the hydrogen peroxide is of 74% and on phenol is of 95%. The ratio pyrocathechin/hydroquinone is of 2.3:1.

EXAMPLE 2

It is operated according to the same molalities set forth in example 1, by adding 10.5 g of 59.4 percent hydrogen peroxide. The yield of diphenols on the hydrogen peroxide and on the phenol is respectively of 63 percent and 87 percent. The ratio pyrocatechin/hydroquinone is of 2.3:1.

EXAMPLE 3

It is operated according to example 1, but adding 17.2 g of 59.4% hydrogen peroxide. The yield of diphenols on the hydrogen peroxide and on phenol is respectively of 55% and 78%. The ratio pyrocatechin/hydroquinone is of 2.3:1.

EXAMPLE 4

It is operated according to example 1 but using an amount of catalyst as high as 126 mg. The yield of diphenols on hydrogen peroxide and on phenol is respectively of 74 percent and 95 percent. The ratio pyrocatechin/hydroquinone is 2.3:1.

EXAMPLE 5

It is operated according to example 1 but using 15.7 mg of catalyst. The yield of diphenols on the hydrogen peroxide and phenol is respectively of 62 percent and 86 percent.

EXAMPLE 6

It is operated according to example 1 adding to the reacting mixture as a catalyst, instead of ferrocene, 91.4 mg of 1,1'-diacetylferrocene. The yield of diphenols on the hydrogen peroxide and on phenol is respectively of 64 percent and 85 percent. The ratio pyrocatechin/hydroquinone is of 2.3:1.

EXAMPLE 7

In a 250 ml flask provided with stirrer, thermometer, feeding funnel and reflux cooler 35 ml of water, 94 g of phenol, 35 g of acetonitrile, 63 mg of ferrocene are introduced. The pH value is adjusted to 1.3 by means of 0.1 N sulphuric acid. To this solution kept at 40°C, 5.61 g of 59.4 percent hydrogen peroxide are added. The reaction is completed within 2 hours. For the remainder the process is carried out according to example 1. The yield of diphenols on the hydrogen peroxide and on phenol is respectively of 70% and 92%.

What we claim is:

1. Process for the preparation of pyrocatechin and hydroquinone as a mixture prevailing in pyrocatechin, comprising hydroxylating phenol with a 30 to 60% aqueous solution of hydrogen peroxide having a molar ratio of phenol: hydrogen peroxide of greater than 2 at atmospheric pressure and at a temperature of from 0-100°C. in the presence of a catalyst selected from the group consisting of dicyclopentadyeniliron, 1,1'-diacetyl-ferrocene, 1,1'-dibenzoyl ferrocene, di-n-butyl-ferrocene, ferrocendicarboxylic acid in an amount greater than 10 ppm by weight of catalyst per million parts by weight of phenol.

2. Process according to claim 1, characterized in that the catalyst is used in an amount of between 50 and 1500 parts by weight per million parts by weight of phenol.

3. Process according to claim 1, characterized in that the catalyst is recovered by distillation.

4. Process according to claim 1, characterized in that the pH of the reacting mixture containing phenol, water and catalyst is initially adjusted between 1 and 4 prior to addition of the hydrogen peroxide.

5. Process according to claim 1, characterized in that it is performed at a temperature of between 30° and 70°C.

6. Process according to claim 1, characterized in that the molar ratio phenol:hydrogen peroxide is between 10 and 3.

7. Process according to claim 1, characterized in that the weight ratio phenol:water is comprised between 10 and 1.

8. Process according to claim 1, characterized in that it is carried out in the presence of an organic solvent miscible with water and stable to hydrogen peroxide.

* * * * *